United States Patent
Wu et al.

(10) Patent No.: US 6,813,710 B1
(45) Date of Patent: Nov. 2, 2004

(54) INVISIBLE ELECTRONIC SIGNATURE

(75) Inventors: Kuang-Shyr Wu, Tao-Yuan Hsien (TW); Tao-I Hsu, Ping-Chen (TW)

(73) Assignee: Chung Shan Institute of Science and Technology, Tao-Yuan (TW)

( * ) Notice: Subject to any disclaimer, the term of this patent is extended or adjusted under 35 U.S.C. 154(b) by 884 days.

(21) Appl. No.: 09/639,675

(22) Filed: Aug. 10, 2000

(51) Int. Cl.[7] .............................. H04L 9/06; H04L 9/20; G06K 9/18; G06K 9/46
(52) U.S. Cl. ...................... 713/176; 382/232; 382/166
(58) Field of Search ................................ 382/232, 166; 713/176; 370/335

(56) References Cited

U.S. PATENT DOCUMENTS 5,748,783 A * 5/1998 Rhoads ....................... 382/232
6,215,778 B1 * 4/2001 Lomp et al. ................. 370/335
6,658,146 B1 * 12/2003 Iourcha et al. .............. 382/166

* cited by examiner

Primary Examiner—Matthew Smithers
Assistant Examiner—Tremayne Norris
(74) Attorney, Agent, or Firm—W. Wayne Liauh

(57) ABSTRACT

A method of producing an invisible electronic signature insusceptible to human damages or anamorphous compression. This new electronic signature technology uses the pixel contrast, error propagation, channel coding and cross encoding techniques. Once the electronic signature is embedded, it can still be recovered and recognized even after the generated image is damaged by human errors or anamorphous compression.

10 Claims, 5 Drawing Sheets

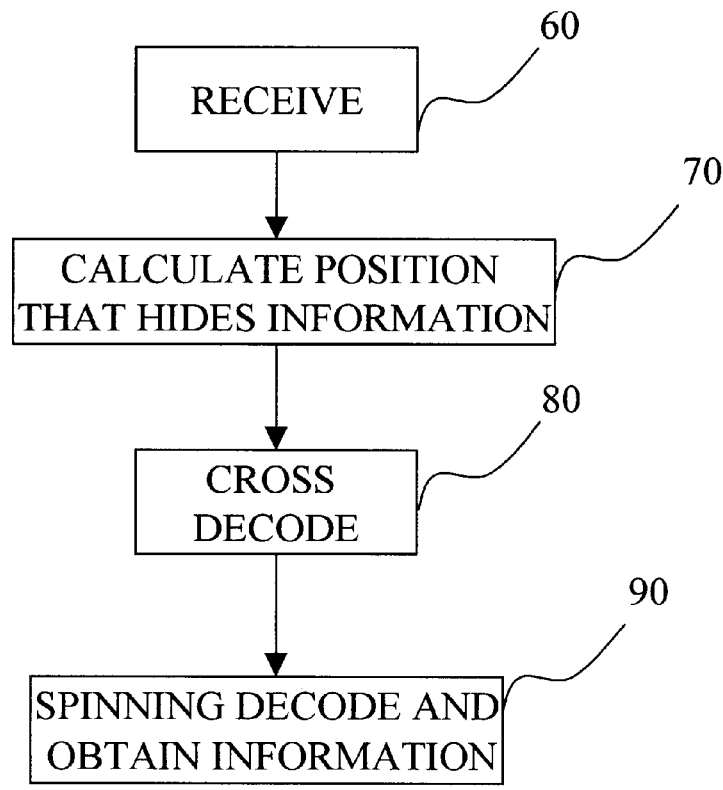

INVISIBLE ELECTRONIC SIGNATURE

BACKGROUND OF THE INVENTION

1. Field of Invention

The present invention relates to a method of hiding an electronic signature and, in particular, to a method of producing an invisible electronic signature.

2. Related Art

Owing to the rapid development in computer network technology, the whole world has entered the digital era. This has made information communications and knowledge sharing much easier. However, the issue of security over the network gradually threatens the efforts in protecting network intellectual properties. The applications of computer networks in national defense, such as the information systems in command, management, communications and intelligence or modem weapon equipment, are more and more popular. Therefore, how classified information can acquire safety authenticates on the network has become an urgent problem to be solved. Practically speaking, the so-called electronic signature technology refers to the techniques that prevent unintended users from eavesdropping, copying and modifying others' information so that the legal user can extract authenticated information from a meaningful image. The researches of electronic signatures in digital copyright focus at ensuring that the attached electronic signature does not alter the visual quality of the original article and is not easy to be detected and changed or removed by hackers so that the belonging of the digital copyright can be correctly determined.

By electronic signature technology refers to embedding a portion of meaningful texts, image or video signal during the image transmission. It is made to be hard for an unauthorized third party to see whether there is hidden information or not in the transmission process. This can prevent hackers from damaging the transmitted information. A common method seen in the electronic signature technology is to select a host image, hide therein some information and thus generate another watermarked image. This image hidden with a signature looks just like the host image by naked eyes, and it is hard to find out directly that other information is contained therein. Other users on the network cannot determine whether this signed image contains other information or not. Thus, from all the information on the network unauthorized users are unable to distinguish electronically signed images from unsigned ones. However, a legal user can readily extract the hidden electronic signature from the transmitted information.

Normally, the electronic signature technology must have the following features:

1. Undetectable: The electronic signature is hidden behind the image information so that it would not be found using usual image processing methods.
2. Invisible: An image attached with the electronic signature looks the same as the host image by naked eyes.
3. Undeletable: The electrical signature added to the image cannot be easily deleted using simple image processing methods.
4. Resistant to image manipulation: The electrical signature is not susceptible to damages caused by normal image processing or on purpose.

The electronic signature technology has the space and frequency domains. In the research field of the frequency domain, using frequency expansions on the electronic signature is fine but has the following three disadvantages:

1. The computation is too tedious. Conversion to the frequency domain requires complicated calculation. The receiver end also needs the corresponding converter. This is inconvenient to applications that demand real time processing.
2. It is vulnerable to attacks. Most hiding methods in the frequency domain hide the information in peripheral sections to avoid damages caused by anamorphous compression. Therefore, it is easy for invaders to attack the hidden information.
3. It can hide relatively little information. The information can only be hidden within a specific frequency band in the frequency domain, so it can hide relatively little information.

In the space domain, a commonly employed information hiding method is the vector quantization. It uses a codebook commonly owned by both the sender and the receiver to encode the electronic signature. Over the sender end, the sender cuts the electronic signature to be hidden into the same size as the blocks in the code book, finds a similar block from the code book and hides in the image its index in place of the information in this block, and finally sends it to the network. Over the receiver end, when the receiver receives the image with hidden information he decodes the index, looks it up in the codebook and restores the information. The defect of this method is that there is larger information anamorphosis and that the image with hidden information cannot withstand the damages caused by anamorphosis.

Another electronic signature technology uses fixed areas in image pixels to hide information, e.g., the fixed range equalization method. The gray scale of the image to hide information in this method is divided into 16 sections. The hidden information, in unit of bytes, replaces the original value at a point depending upon the space the input value belongs to. For example, if the information has a value of 17, then one point within the range from 16~31 is thus replaced by 17. There is yet another method called LSB, which is also often used for hiding information. LSB places the electronic signature in the lower (less important) bytes because the change in lower bytes has less impact on the whole pixel values and thus has less obvious damages to the image. Nevertheless, the above two methods cannot withstand the anamorphous damages after the image is hidden with information.

SUMMARY OF THE INVENTION

The present invention provides a method of producing an invisible electronic signature, which method uses several image processing techniques. First, the B channel in the RGB color image is selected to hide information because human eyes are not sensitive to the B channel. The information is then embedded therein using cross encoding, channel encoding and pixel location correlation. With the encoding/decoding techniques and the comparison among neighboring pixels, the hidden information can be effectively protected from illegal modification. Also, because of the restoration ability of the channel encoding and the comparison among neighboring pixels, the present invention can correctly restore the information even after anamorphous compression.

The disclosed method can protect the information and withstand anamorphous damages. Using the channel encoding technique and the image correlations, a method of producing an electronic signature is provided by further combining with some basic image hiding techniques. This invention has practical values in determining the belonging of copyrights and information camouflage.

The foregoing and additional advantages and characterizing features of the present invention will become clearly apparent upon a reading of the following detailed description together with the included drawings.

BRIEF DESCRIPTION OF THE DRAWINGS

Other objects and advantages of the present invention will become apparent from the following description of the preferred embodiment with reference to the drawings, in which:

FIG. 5 is a diagram showing the locations of information embedding point and its peripheral relevant pixels during information embedding according to the present invention;

FIG. 6 is a flow chart of the method for extracting the electronic signature according to the present invention:

FIG. 7-1 is a host image;

FIG. 7-2 is electronic signature information to be hidden;

FIG. 7-3 is the image after inserting signature information; and

FIG. 7-4 is the image after human damages.

DETAILED DESCRIPTION OF THE INVENTION

The host image, H, for hiding information in the present invention is an image composed of three m×n pixels of R, G, B colors respectively, the value of each pixel ranging from 0 to 255. The information to be hidden in the host image is a bit series with L bits. So the host image H and the embedded image W are:

$$H=\{h_{ij}|0\leq i<m, 0\leq j<n, h_{ij}\in[0,255]\},$$

$$W=\{w_i|0\leq i<L, w_i\in[0,1]\},$$

A set $ASET_{i,j}=\{h_{i-1,j}, h_{i-1,j+1}, h_{i,j+1}, h_{i-1,j+1}\}$ is defined for the four pixels that surround any pixel $h_{ij}$ in the host image on the right hand side.

Figure 1:
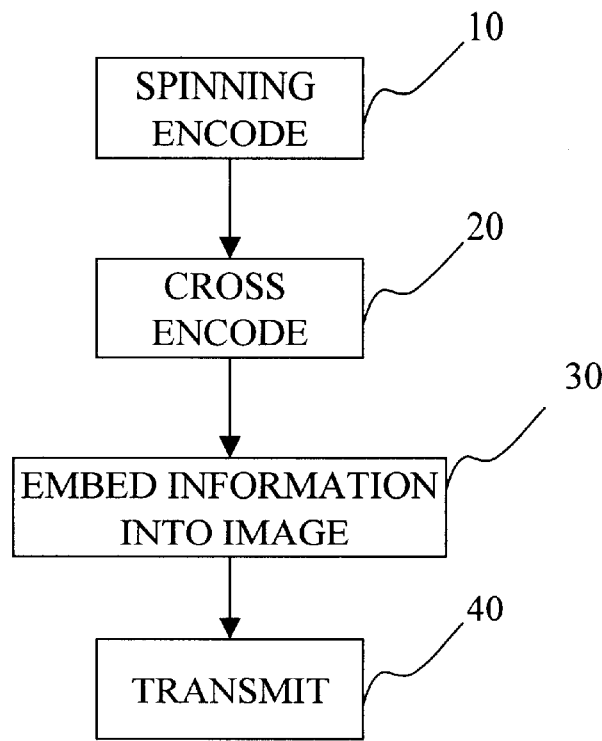
FIG. 1 is a flow chart of the method of hiding an electronic signature according to the present invention.

The method of embedding an electronic signature disclosed herein has a flow chart as shown in FIG. 1. It consists of three steps: spinning encoding (step 10), cross encoding (step 20) and embedding information into the image (step 30). The process is done to the B channel. After the three steps are completed, the image embedded with the electronic signature is transmitted (step 40).

Figure 2:
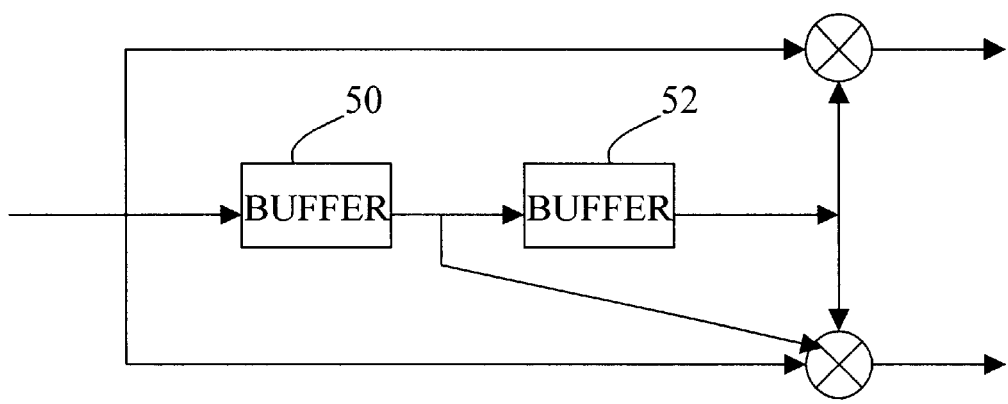
FIG. 2 is a functional diagram of input and output using spinning code according to the present invention.

In the first step of spinning encoding, the spinning encoding is a type of channel encoding. The purpose of the channel encoding is to make the encoded information free from noises during transmission. Using the feature of embedding information in the host image, the size of the image would not be increased after channel encoding and it can be restored even after image compression or human damages. In practice, the (2,1,7) spinning codes are employed to generate information that is twice that of the embedded information using a spinning encoder. The extra encoding information is used to correct the transmission errors or human damages. By (2,1,7), the first component 2 means that the encoded output is in 2 bits, the second component 1 means that the input information is in 1 bit, and the third component 7 means that there are 6 (=7−1) buffers. Spinning codes of different complexities can be used on different hardware. If the hardware can provide greater computation power, a more complicated spinning encoder can be used to obtain a better anti-interference effect. FIG. 2 is a functional diagram of input and output using spinning code according to the present invention, wherein the hardware structure has two buffers 50,52 for the spinning code (2,1,3).

Figure 3:
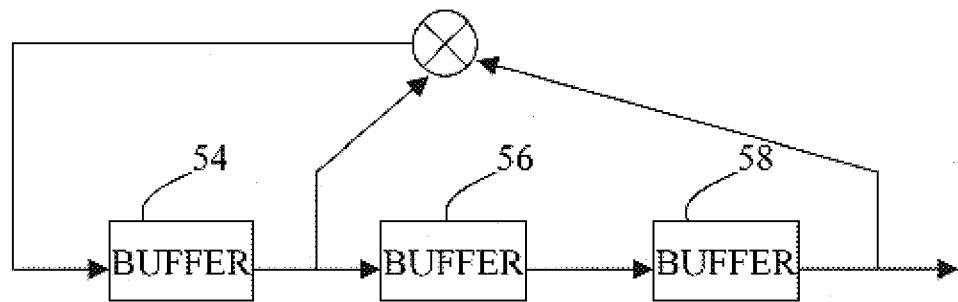
FIG. 3 is a schematic view of the hardware circuit in the cross code generator according to the present invention.
Figure 4:
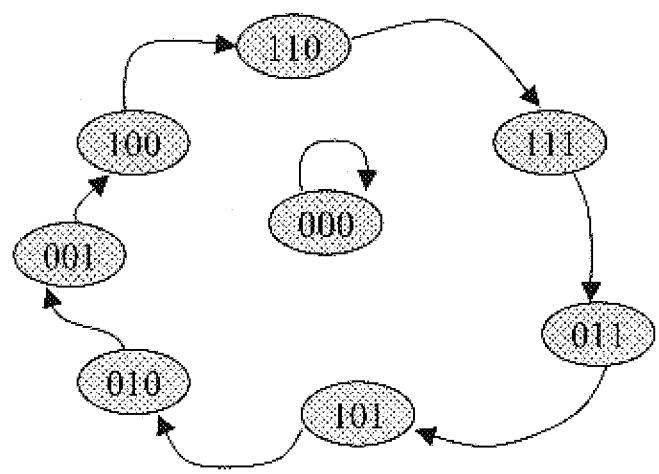
FIG. 4 shows a state of a random number sequence in the buffer of the present invention.
Figures 1, 7:
Figures 2, 7:
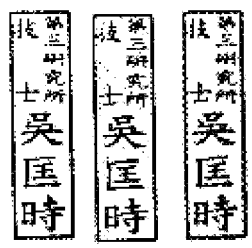
Figures 3, 7:
Figures 4, 7:

In the second step of performing cross encoding, the random number generator of a linear feedback shift register generates a set of so-called m-sequence random numbers. The seed used is the private key, the first key to information restoration. The receiver has to have this key to extract the information. If the information is in 8 bits, the key can be cross generated using the hardware shown in FIG. 3, which is a schematic view of the hardware circuit in the cross code generator according to the present invention. The feedback function is f(x1,x2,x3)=x1+x3, which can generate a random number sequence with a cycle of 7. The state of the random number sequence is shown in FIG. 4. The digital information such as (010) in FIG. 4 represents the contents of buffers 54,56,58 in FIG. 3. Different initial values can be different seeds for generating random numbers of different orders. These different orders are used to permute the 8 bits of information for cross effects. Since the present method has a greater randomness than the conventional cross methods (matrix), does not need to store the whole table, and needs only one initial value, large memory space can be saved.

Third step of information embedding comprises location selection and information implantation. A proper location is selected from the host image and then the information is hidden therein. When each bit of the information is added into the host image, the pixels around the host image are processed first. The present invention uses a random number generator to "play dice" for the host image from left to right and from top to bottom. If the dice-playing wins, that pixel of the host image is selected as one information embedding point. If the pixel $h_{ij}$ is an information embedding point, the positions of the surrounding pixels are as shown in FIG. 5.

The percentage of the random number generator determines L positions (or its multiples, depending upon the character of the spinning code) as the information embedding points. For example, if the random number generator generates numbers between 1 through 10 and the number of bits of the information to be embedded is 30% of the total number of pixels in the B channel of the host image, then whenever 1, 2 or 3 is obtained in the dice-playing, this pixel is considered as an information embedding point; otherwise, the system processes the next pixel. The seed of the random numbers is the second key to extract the information (the hidden electronic signature).

After spinning encoding, the embedded information is multiplied by L. For example, the (2,1,7) encoding would make L-bit information into 2L-bit information. If the current bit to be inserted is w and the information embedding point in the host image is $h_{ij}$, then a temporary variable h' is calculated as follows:

$$h'=(h_{i-1,j-1}+h_{i,j-1}+h_{i-1,j+1}+h_{i-1,j}+h_{i,j})/5,$$

The values of $h_{i,j}$, and $ASET_{i,j}$ are adjusted according to:

$$h_{i'j'}=h_{i'j'}+((h'+(2w-1)\times th)-h_{ij})/4 \text{ for each } h_{i'j'}\in ASET_{ij},$$

$$h_{ij}=h'+(2w-1)\times th,$$

where th is a threshold. The larger the threshold is, the more resistant the method is to damages and yet the more serious the image anamorphosis is. Through all the above pixel calculation, the electronic signature can be successfully embedded into the image.

FIG. 6 is a flow chart of the method for extracting the electronic signature according to the present invention. When the image is transmitted to and received by the receiver (step 60), the information can be extracted by reversing the steps in the above-mentioned method of embedding an electronic signature. In the step of extracting information, the pixels of the electronic signature embedded image are calculated using the second key in order from left to right and from top to bottom so as to obtain the positions hiding the information (step 70). For each information embedding point $h_{i,j}$, h' is obtained as when embedding the electronic signature:

$$h'=(h_{i-1,j-1}+h_{i,j-1}+h_{i-1,j+1}+h_{i-1,j}+h_{i,j})/5,$$

and the corresponding information at this position is extracted by having w=1 if $h' \leq h_{i,j}$, w=0 otherwise.

When each bit of information is restored in order, the whole information is sent for cross decoding (step 80).

Cross decoding uses the first key in the information embedding to rebuild the shuffled information. This key is the seed used by the random number generator of the linear feedback shift register in cross encoding. This seed is used again to run the random number generator to get the original addresses of each pixel so that the information can be reconstructed back to the order before cross encoding.

The last step of the information extraction is to spinning decode (step 90). Viterbi algorithm is employed to correct information with errors. Soft input can be used to further increase the decoding power. The trellis diagram for spinning decoding can be setup in advance to save information restoration time. Thus, the hidden information can be restored after spinning decoding.

Through the verification by Attachments 1 through 4, the human damaged or JPEG compressed host image that has been embedded with hidden information of an electronic signature can still be clearly recognized.

EFFECTS OF THE INVENTION

The method of embedding an invisible electronic signature disclosed herein can achieve the following effects:

1. By distributing hidden information, the embedded image is hard to be detected.
2. The B channel is used to store information, so naked eyes cannot recognize.
3. The information cannot be easily removed under the protection of random codes.
4. The spinning encoding can correct possible errors during transmission.
5. The cross encoding can fully randomize the information and avoid the occurrence of burst errors.
6. By information embedding, neighboring points share part of the information hidden in a single pixel. Therefore, the method can fight against single point damages and it is not easy for the host image to be ruined due to information distribution.
7. Two keys are employed to prevent unauthorized persons from eavesdropping and cracking. The method of the present invention provides a secure transmission for the network.

It is appreciated that various modifications to the invention concepts described herein may be apparent to those skilled in the art without departing from the spirit and the scope of the present invention defined by the hereinafter appended claims.

What is claimed is:

1. A method for producing an invisible electronic signature, which method comprises the steps of:

inputting the electronic signature to be embedded into a spinning encoder and generating using spinning codes encoded information whose length is a multiple of the original electronic signature;

generating a random number sequence using cross encoding for permuting the encoded information, the seed of the random numbers being a first key;

selecting a pixel of a host image H using a random number generator as an information embedding point of the encoded information, the seed of the random number generator being a second key, and embedding the encoded information into the B channel of the pixel of the host image;

wherein the host image H is an image of m×n pixels and the electronic signature to be embedded is information W with a size L, both the host image H and the embedded information W being expressed as:

$$H=\{h_{ij}|0 \leq i<m, 0 \leq j<n, h_{ij}\in[0,255]\},$$

and $$W=\{w_i|0 \leq i<L, w_i\in[0,1]\},$$

and a set $ASET_{ij}=\{h_{i+1,j}, h_{i-1,j+1}, h_{i,j+1}, h_{i+1,j+1}\}$ being defined for four pixels surrounding and to the right of any pixel $h_{ij}$ in the host image.

2. The method according to claim 1, wherein the spinning encoding corrects transmission errors or human damages on the encoded information.

3. The method according to claim 1, wherein the random number sequence is generated by a linear feedback shift register.

4. The method according to claim 3, wherein the linear feedback shift register comprises a plurality of buffers.

5. The method according to claim 1 further comprising the following steps for extracting the embedded information:

using the second key to compute the embedding positions of the encoded information;

using the first key to reconstruct the encoded information and to restore the order before cross encoding; and decoding the encoded-information using spinning decoding.

6. The method according to claim 5, wherein a temporary variable is defined to be $h'=(h_{i-1,j-1}+h_{i,j-1}+h_{i-1,j+1}+h_{i-1,j}+h_{i,j})/5$.

7. The method according to claim 5, wherein $h_{ij}$ and $ASET_{ij}$ are adjusted according to:

$$h_{i'j'}=h_{i'j'}+((h'+(2w-1)\times th)-h_{ij})/4 \text{ for each } h_{i'j'}\in ASET_{ij},$$

and $$h_{ij}=h'+(2w-1)\times th$$

wherein th is a threshold.

8. The method according to claim 7, wherein th is a threshold.

9. The method according to claim 7, wherein the electronic signature is true if $h' \leq h_{ij}$ in the step of using the second key to compute the embedding positions of the encoded information.

10. The method according to claim 7, wherein the spinning decoding adopts the Viterbi algorithm.

* * * * *